US011575444B2

(12) United States Patent
Soto et al.

(10) Patent No.: US 11,575,444 B2
(45) Date of Patent: *Feb. 7, 2023

(54) COMMUNICATION SYSTEM AND METHOD FOR AN OPTICAL LOCAL AREA NETWORK

(71) Applicants: Alexander Ivan Soto, San Diego, CA (US); Walter Glenn Soto, San Clemente, CA (US)

(72) Inventors: Alexander Ivan Soto, San Diego, CA (US); Walter Glenn Soto, San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,507

(22) Filed: Apr. 21, 2022

(65) Prior Publication Data
US 2022/0321224 A1 Oct. 6, 2022

Related U.S. Application Data

(63) Continuation of application No. 17/138,794, filed on Dec. 30, 2020, which is a continuation of application No. 16/866,479, filed on May 4, 2020, now Pat. No. 10,917,176, which is a continuation of application No. 16/734,270, filed on Jan. 3, 2020, now Pat. No. 10,644,802, which is a continuation of application
(Continued)

(51) Int. Cl.
H04B 10/27 (2013.01)
H04J 14/08 (2006.01)
H04Q 11/00 (2006.01)
H04B 10/40 (2013.01)
H04B 10/25 (2013.01)
H04Q 11/04 (2006.01)

(52) U.S. Cl.
CPC ......... *H04B 10/40* (2013.01); *H04B 10/2589* (2020.05); *H04B 10/27* (2013.01); *H04J 14/08* (2013.01); *H04Q 11/0067* (2013.01); *H04Q 11/0457* (2013.01); *H04J 2203/0082* (2013.01); *H04Q 2011/009* (2013.01); *H04Q 2011/0064* (2013.01)

(58) Field of Classification Search
None
See application file for complete search history.

(56) References Cited

U.S. PATENT DOCUMENTS 5,847,751 A * 12/1998 Safadi ............... H04N 21/2381
348/E5.006
6,023,467 A * 2/2000 Abdelhamid ......... H04J 3/1682
370/486

(Continued)

OTHER PUBLICATIONS

Finley: "Optical Fibers in Local Area Networks", IEEE Communications Magazine, vol. 22, No. 8, Aug. 1984, pp. 22-34 (Year: 1984).*

Primary Examiner — Li Liu

(57) ABSTRACT

An optical local area network includes a passive optical distribution fabric interconnecting a plurality of nodes including a first node and a plurality of remaining nodes, a hub that includes the first node and a control module, and a client network adapter coupled to each of the remaining nodes for responding to the control module. The control module controls timing for each of the client network adapters to transmit signals over the passive optical distribution fabric and distribution of signals to each of the nodes.

20 Claims, 14 Drawing Sheets

Related U.S. Application Data

No. 14/588,899, filed on Jan. 2, 2015, now Pat. No. 10,892,828, which is a continuation of application No. 13/543,880, filed on Jul. 8, 2012, now Pat. No. 8,958,697, which is a continuation-in-part of application No. 12/982,872, filed on Dec. 30, 2010, now Pat. No. 8,238,754, and a continuation-in-part of application No. 12/512,968, filed on Jul. 30, 2009, now Pat. No. 9,337,948, which is a continuation-in-part of application No. 11/772,187, filed on Jun. 30, 2007, now abandoned, which is a continuation of application No. 10/886,514, filed on Jul. 6, 2004, now Pat. No. 7,925,162, which is a continuation of application No. 10/865,547, filed on Jun. 10, 2004, now Pat. No. 7,242,868.

(60) Provisional application No. 60/515,836, filed on Oct. 30, 2003, provisional application No. 60/485,072, filed on Jul. 3, 2003, provisional application No. 60/480,488, filed on Jun. 21, 2003, provisional application No. 60/477,845, filed on Jun. 10, 2003.

(56) References Cited

U.S. PATENT DOCUMENTS

| | | | | |
|---|---|---|---|---|
| 6,075,787 A * | 6/2000 | Bobeck | | H04Q 11/0478 370/395.2 |
| 6,229,823 B1 * | 5/2001 | Scarmalis | | H04L 69/04 370/477 |
| 6,421,150 B2 * | 7/2002 | Graves | | H04Q 11/0478 398/58 |
| 6,498,667 B1 * | 12/2002 | Masucci | | H04Q 11/0067 398/99 |
| 6,778,550 B1 * | 8/2004 | Blahut | | H04J 3/1694 370/449 |
| 7,031,343 B1 * | 4/2006 | Kuo | | H04Q 11/0062 370/473 |
| 7,181,142 B1 * | 2/2007 | Xu | | H04J 3/14 398/58 |
| 10,644,802 B1 * | 5/2020 | Soto | | H04J 14/08 |
| 10,917,176 B2 * | 2/2021 | Soto | | H04B 10/2589 |
| 2003/0021294 A1 * | 1/2003 | Russell | | H04J 3/1617 370/467 |
| 2003/0190168 A1 * | 10/2003 | Song | | H04Q 11/0062 398/58 |
| 2003/0235205 A1 * | 12/2003 | Song | | H04Q 11/0067 370/466 |
| 2003/0236916 A1 * | 12/2003 | Adcox | | H04L 61/10 709/245 |
| 2004/0052274 A1 * | 3/2004 | Wang | | H04J 3/1694 370/468 |
| 2004/0109450 A1 * | 6/2004 | Kang | | H04L 47/31 370/390 |
| 2004/0141759 A1 * | 7/2004 | Stiscia | | H04L 63/0428 398/58 |
| 2004/0146064 A1 * | 7/2004 | Kramer | | H04L 12/403 370/448 |
| 2004/0146301 A1 * | 7/2004 | Choi | | H04Q 11/0067 398/58 |
| 2005/0249497 A1 * | 11/2005 | Haran | | H04L 47/29 398/58 |

* cited by examiner

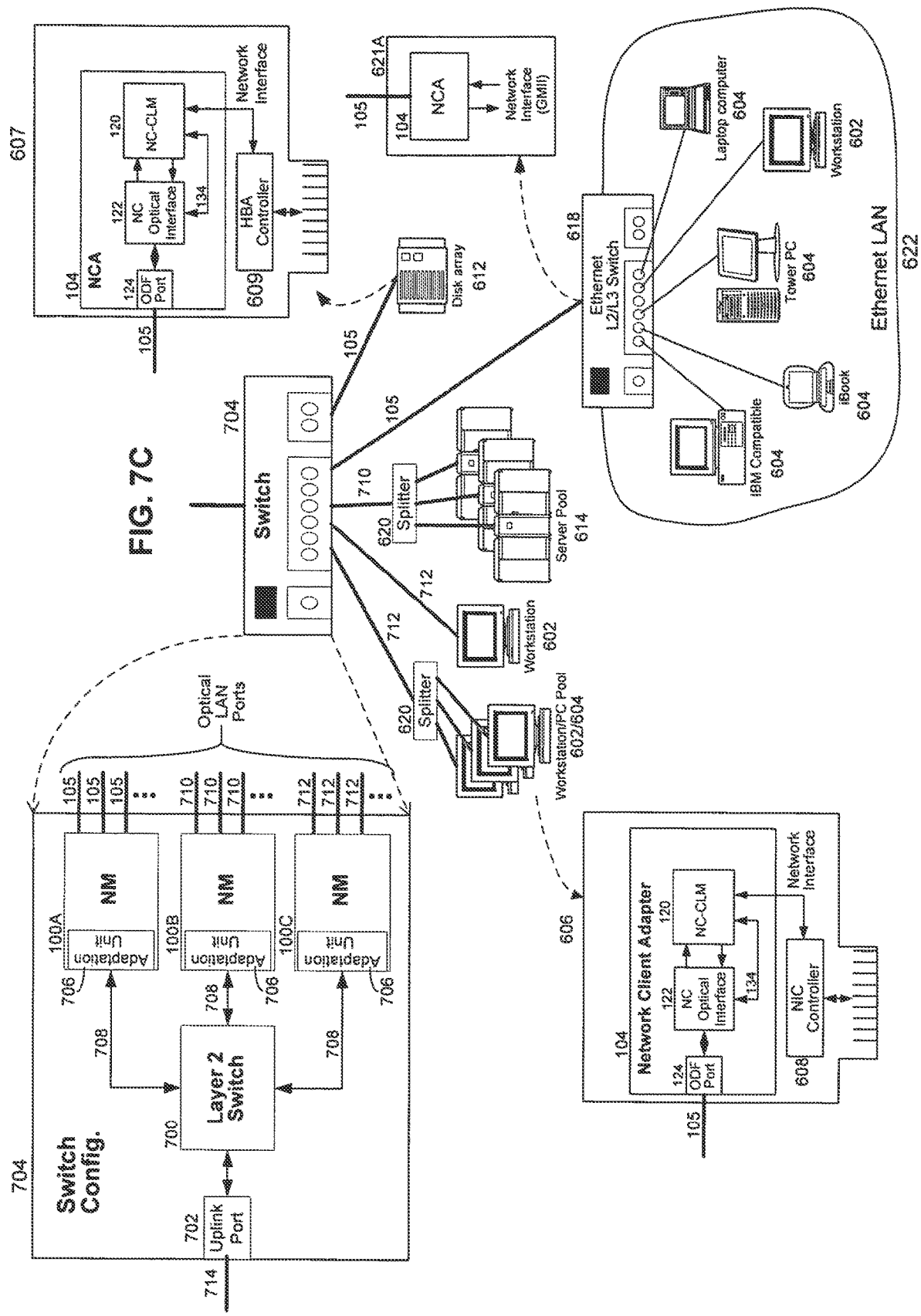

COMMUNICATION SYSTEM AND METHOD FOR AN OPTICAL LOCAL AREA NETWORK

CROSS-REFERENCE TO RELATED APPLICATIONS

This application is filed under 37 C.F.R. § 1.53(b) as a continuation claiming the benefit under 35 U.S.C. § 120 of the patent application Ser. No. 17/138,794, "Communication System and Method for an Optical Local Area Network", which was filed by the same inventors on Dec. 30, 2020, claiming the benefit under 35 U.S.C. § 120 of the patent application Ser. No. 16/866,479, "Communication System and Method for an Optical Local Area Network", which was filed by the same inventors on May 4, 2020, claiming the benefit under 35 U.S.C. § 120 of the patent application Ser. No. 16/734,270, "Communication System and Method for an Optical Local Area Network", which was filed by the same inventors on Jan. 3, 2020, claiming the benefit under 35 U.S.C. § 120 of the patent application Ser. No. 14/588,899, "System and Method for Optical Layer Management in Optical Modules and Remote Control of Optical Modules", which was filed by the same inventors on Jan. 2, 2015, claiming the benefit under 35 U.S.C. § 120 of the patent application Ser. No. 13/543,880, "System and Method for Optical Layer Management in Optical Modules and Remote Control of Optical Modules", which was filed by the same inventors on Jul. 8, 2012, claiming the benefit under 35 U.S.C. § 120 of the patent application Ser. No. 12/982,872, "System and Method for Pluggable Optical Modules for Passive Optical Networks", which was filed by the same inventors on Dec. 30, 2010, claiming the benefit under 35 U.S.C. § 120 of U.S. Pat. No. 7,925,162 filed on Jul. 6, 2004 claiming the benefit under 35 U.S.C. 119(e) of U.S. Provisional Application No. 60/485,072 filed Jul. 3, 2003, and U.S. Provisional Application No. 60/515,836 filed Oct. 30, 2003, and claiming the benefit under 35 U.S.C. § 120 of the patent application Ser. No. 12/512,968, "System and Method For Performing High Speed Communications Over Fiber Optical Networks", which was filed by the same inventors on filed Jul. 30, 2009 claiming the benefit under 35 U.S.C. § 120 of U.S. patent application Ser. No. 11/772,187, which was filed by the same inventors on Jun. 30, 2007, claiming the benefit under 35 U.S.C. § 120 of commonly-assigned U.S. patent application Ser. No. 10/865,547 filed by the same inventors on Jun. 10, 2004, now U.S. Pat. No. 7,242,868, which claims the benefit under 35 U.S.C. 119(e) of U.S. Provisional Application No. 60/477,845 filed Jun. 10, 2003, and U.S. Provisional Application No. 60/480,488 filed Jun. 21, 2003, and entirely incorporated herein by reference.

FIELD OF THE INVENTION

The present invention relates to optical fiber networks.

BACKGROUND OF THE INVENTION

A local-area network (LAN) is a computer network that spans a relatively small area or domain. Most LANs are confined to a single building or group of buildings. However, one LAN can be connected to other LANs over any distance often spanning an area greater than either LAN via telephone lines, coaxial cable, optical fiber, free-space optics and radio waves. A system of LANs can be connected in this way via other networks that are commonly referred to as wide-area networks (WANs).

SUMMARY OF THE INVENTION

In general, in one aspect, the invention includes a method for broadcasting data including receiving an incoming optical signal at a first port of a plurality of ports; converting the received incoming optical signal to an electrical signal; processing the electrical signal; converting the processed electrical signal to a broadcast optical signal; and coupling the broadcast optical signal to each of the plurality of ports.

Aspects of the invention may include one or more of the following features. Processing the electrical signal includes coupling the electrical signal to a device that processes the electrical signal according to an OSI layer-2 protocol. Processing the electrical signal includes coupling the electrical signal to a device that processes the electrical signal according to an OSI layer-3 protocol. The method further includes converting an electrical client signal to the incoming optical signal. The method further includes adapting the electrical client signal from a signal conforming to an OSI layer-2 protocol. The OSI layer-2 protocol includes a media access control protocol. The media access control protocol is Ethernet or Fibre Channel. The method further includes transmitting the incoming optical signal from a network client adapter to one of the plurality of ports over an optical distribution fabric. The method further includes transmitting the broadcast optical signal from one of the plurality of ports over an optical distribution fabric; and receiving the broadcast optical signal at network client adapters in a plurality of clients. The method further includes converting the received broadcast optical signal to a second electrical signal in at least one of the clients. The method further includes selecting a frame within the second electrical signal associated with the network client adapter and adapting data in the selected frame for transmission over a network interface.

In general, in another aspect, the invention includes an apparatus including a plurality of ports; a passive optical coupler coupled to each of the plurality of ports; an optical-electrical converter in optical communication with the passive optical coupler; and a control module in electrical communication with the optical-electrical converter for scheduling slots for incoming and outgoing signals over the plurality of ports.

Aspects of the invention may include one or more of the following features. The control module is operable to schedule a slot for receiving a signal over one of the plurality of ports and to schedule a slot for broadcasting a signal over each of the plurality of ports. The apparatus includes only a single optical-electrical converter in optical communication with the passive optical coupler. The control module is coupled to a device that is operable to process an electrical signal provided by the optical-electrical converter according to an OSI layer-2 protocol. The control module is coupled to a device that is operable to process an electrical signal provided by the optical-electrical converter according to an OSI layer-3 protocol.

In general, in another aspect, the invention includes an optical local area network including a plurality of optical waveguides; a network manager that includes an optical-electrical converter in optical communication with the plurality of optical waveguides; and a control module in electrical communication with the optical-electrical converter for scheduling slots for incoming and outgoing signals transmitted over the plurality of optical waveguides; and a plurality of network client adapters coupled to the plurality of optical waveguides, each network client adapter including an optical-electrical converter for processing transmitted and received optical signals at a client.

Aspects of the invention may include one or more of the following features. The optical local area network further includes a passive optical coupler coupled to each of the plurality of optical waveguides. The network manager further includes a passive optical coupler coupled to each of the plurality of optical waveguides. The control module is operable to schedule a slot for receiving a signal over one of the plurality of optical waveguides and to schedule a slot for broadcasting a signal over each of the plurality of optical waveguides. The control module is operable to dynamically schedule a slot for receiving a signal over one of the plurality of optical waveguides in response to a message from one of the network client adapters. The control module is operable to determine a response delay between the optical-electrical converter and one of the network client adapters. The control module is coupled to a device that is operable to process an electrical signal provided by the optical-electrical converter according to an OSI layer-2 protocol. The control module is coupled to a device that is operable to process an electrical signal provided by the optical-electrical converter according to an OSI layer-3 protocol. Each of the network client adapters is operable to convert an electrical client signal to an optical signal for transmission over one of the optical waveguides. Each of the network client adapters is operable to adapt the client signal from a signal conforming to an OSI layer-2 protocol. The OSI layer-2 protocol includes a media access control protocol. The media access control protocol used by a network client adapter is Ethernet or Fibre Channel. Each of the network client adapters is operable to convert a received optical signal to an electrical signal. Each network client adapter is operable to select a frame within the electrical signal associated with the network client adapter. The optical local area network further includes a client that includes a network interface card, the network interface card including one of the network client adapters. The client is selected from the group consisting of a workstation, a personal computer, a disk storage array, a server, a switch, and a router.

In general, in another aspect, the invention includes an optical local area network including a passive optical distribution fabric interconnecting a plurality of nodes including a first node and a plurality of remaining nodes; a hub that includes the first node and a control module; and a client network adapter coupled to each of the remaining nodes for responding to the control module; wherein the control module controls timing for each of the client network adapters to transmit signals over the passive optical distribution fabric and distribution of signals to each of the nodes.

Aspects of the invention may include one or more of the following features. The control module is operable to schedule a slot for receiving a signal from one of the remaining nodes and to schedule a slot for broadcasting a signal to each of the remaining nodes. The control module is operable to dynamically schedule a slot for receiving a signal from one of the remaining nodes in response to a message from one of the network client adapters. The control module is operable to determine a response delay between the hub and one of the network client adapters. The control module is coupled to a device that is operable to process signals according to an OSI layer-2 protocol. The control module is coupled to a device that is operable to process signals according to an OSI layer-3 protocol. Each of the network client adapters is operable to convert an electrical signal to an optical signal for transmission over the passive optical transmission fabric. Each of the network client adapters is operable to adapt a signal conforming to an OSI layer-2 protocol. The OSI layer-2 protocol includes a media access control protocol. The media access control protocol used by a network client adapter is Ethernet or Fibre Channel. Each of the network client adapters is operable to convert a received optical signal to an electrical signal. Each network client adapter is operable to select a frame within the electrical signal associated with the network client adapter. The optical local area network further includes a client that includes a network interface card, the network interface card including one of the network client adapters. The client is selected from the group consisting of a workstation, a personal computer, a disk storage array, a server, a switch, and a router.

In general, in another aspect, the invention includes an optical local area network including a hub; a plurality of external nodes interconnected by a passive optical distribution fabric, wherein the external nodes are located external to the hub, and the hub is operable to control traffic across all nodes; adaptors at each external node responsive to hub instruction; and an interface coupled to the hub coupling signals received from any individual external node for distribution to all external nodes.

Aspects of the invention may include one or more of the following features. The hub includes an internal node coupled to the passive optical distribution fabric. The hub is operable to measure response delay between the hub and external nodes. The hub is operable to allocate slots for external nodes dynamically. Slot allocations are made to guarantee external nodes have a minimum bandwidth. The optical local area network further includes splitters coupled between the hub and external nodes. Traffic arriving at one or more external nodes includes Ethernet traffic. Traffic arriving at one or more external nodes includes Fibre channel traffic. The hub includes an optical module. At least one of the external nodes is located within an optical module external to the hub.

Implementations of the invention may include one or more of the following advantages. A network manager in an optical local area network can provide switching functions of a hub, a switch or a router. A switch configuration in which network managers are aggregated enables a high performance network in a compact apparatus. Connectivity of network managers and network client adapters to existing conventional routers and switches using industry standard form factor optical modules enables a high performance network upgrade with minimal new equipment. A network client switch can support multiple physical layer ports without necessarily requiring a Layer-2 MAC or switching elements and the associated routing tables and packet memory. The number of optical transceivers and switching elements used to sustain the same number of computing nodes in a LAN via a point-to-multipoint optically coupled network configuration is reduced, thus saving the majority of expense described above.

BRIEF DESCRIPTION OF THE DRAWINGS

FIGS. 7A-7D are diagrams of optical local area networks utilizing a switch configuration.

DETAILED DESCRIPTION

Figure 1:
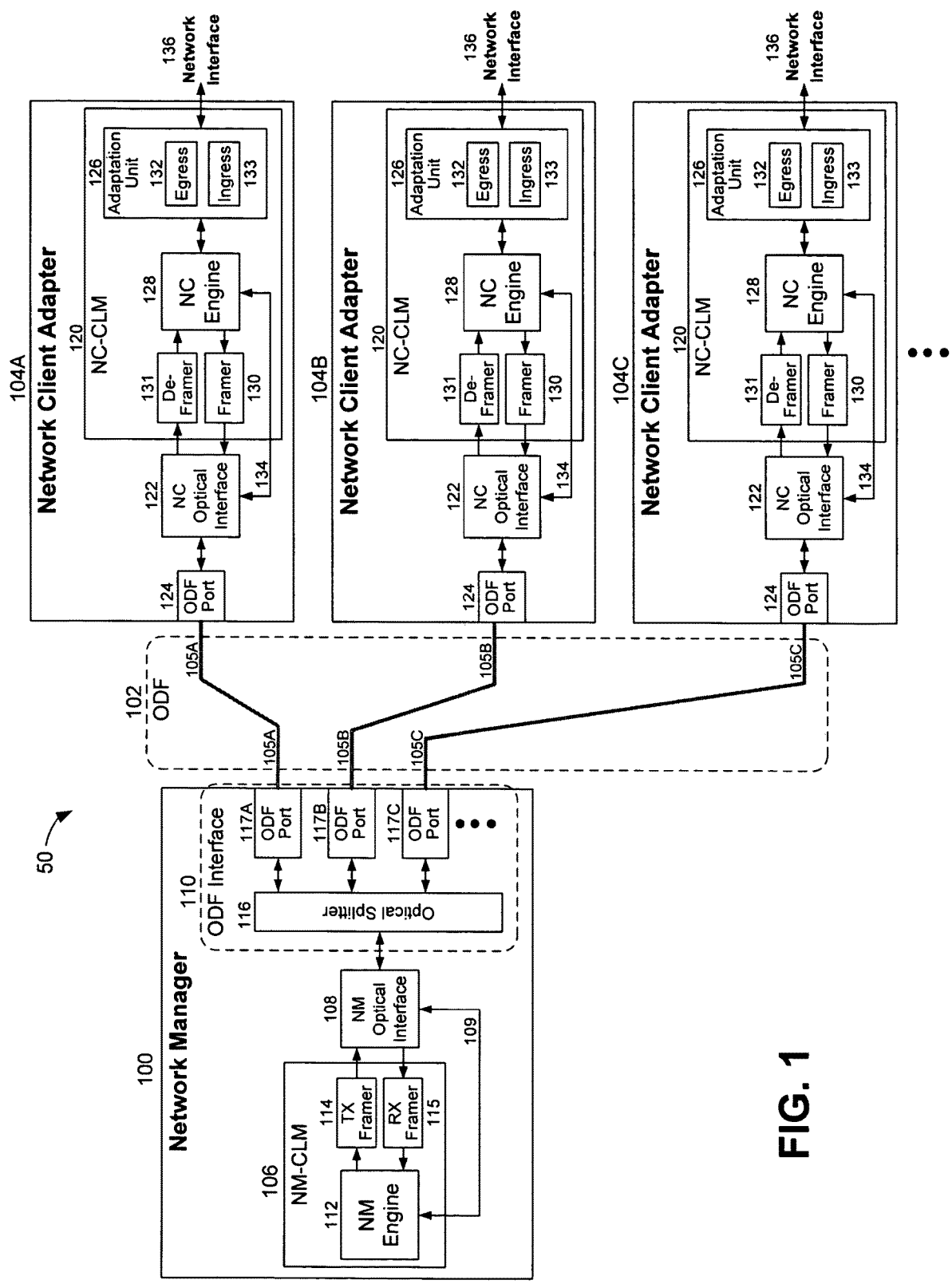
FIG. 1 is a block diagram of an optical local area network.

Referring to FIG. 1, a high-level schematic of an optical local area network 50 includes a network manager (NM) 100 at the head end of a passive optical distribution fabric (ODF) 102. The NM 100 acts as a central transmission point and an overall controlling device for the optical local area network 50. On another end, the ODF 102 is terminated by a plurality of (in one implementation, generally similar) network client adapters (NCAs) 104A, 104B, 104C. Herein the NCA 104A, NCA 104B, NCA 104C, are also referred to collectively as NCAs 104. Though three NCAs 104 are shown more or fewer NCAs may be included in the optical local area network 50.

The NM 100 transmits/receives data to/from the NCAs 104 in the form of modulated optical light signals of known wavelength through the ODF 102. The transmission mode of the data sent over the ODF 102 may be continuous, burst or both burst and continuous modes. Both NM 100 and NCAs 104 may transmit light signals having a same wavelength. In one implementation, the light signals are polarized and the polarization of light transmitted by the NM 100 is perpendicular to the polarization of the light transmitted by the NCAs 104. Alternatively, the transmissions can be-made in accordance with a time-division multiplexing scheme or similar protocol.

In another implementation, bi-directional wavelength-division multiplexing (WDM) may be used. Bi-directional WDM is herein defined as any technique by which two optical signals having different wavelengths may be simultaneously transmitted bi-directionally with one wavelength used in each direction over a single fiber. In yet another implementation, bi-directional dense wavelength-division multiplexing (DWDM) may be used. Bi-directional DWDM is herein defined as any technique by which more than two optical signals having different wavelengths may be simultaneously transmitted bi-directionally with more than one wavelength used in each direction over a single fiber with each wavelength unique to a direction. For example, if bi-directional WDM is used, the NM 100 may transmit data to an NCA 104A, 104B, 104C utilizing a first wavelength of modulated light conveyed via a fiber 105A, 105B, 105C, respectively, in the ODF 102 and, similarly, the NCAs 104A, 104B, 104C may transmit data via the same fiber 105A, 105B, 105C, respectively, in the ODF 102 to the NM 100 utilizing a second wavelength of modulated light. Because only a single fiber is used (e.g., between the NM 100 and each respective NCA 104), this type of transmission system is commonly referred to as a bi-directional transmission system. Although the optical local area network 50 illustrated in FIG. 1 includes an NM 100 in communication with a plurality of NCAs 104 using a plurality of fibers, other implementations of optical local area networks 50 may be used. In some implementations, the NCAs 104 are generally similar. In other implementations, the NCAs 104 may differ in one or more aspects.

The NM 100 includes network management communication logic and memory (NM-CLM) 106 block, a network management optical interface (NM Optical Interface) 108 block and an optical distribution fabric interface (ODF Interface) 110 block. The NM-CLM 106 includes a network manager engine (NM Engine) 112 block, a transmit framer (Tx Framer) 114 block and a receive framer (Rx Framer) 115 block.

The NM Engine 112 is a control module that performs various processing and scheduling functions of an NM 100. The Tx Framer 114 frames outgoing data from the NM Engine 112 in accordance with a framing protocol that is in-use. The Rx Framer 115 receives incoming frames and recovers appropriate data and messages to pass on to the NM Engine 112. The NM Optical Interface 108 is controlled by the NM-CLM 106 using, for example, bus 109. The NM Optical Interface 108 converts electrical signals carrying data from the Tx Framer 114 to optical signals, for example, by modulating a laser (not shown) included in the NM Optical Interface 108 and transmitting the laser output to the ODF interface 110. The NM Optical Interface 108 also receives optical signals from the ODF interface 110 and converts the optical signals to electrical signals carrying data that is then transferred to the Rx Framer 115. Thus, the NM Optical Interface 108 functions as an "optical-electrical converter" that can convert a signal from an optical signal to electrical signal or from an electrical signal to an optical signal.

The ODF Interface 110 includes an optical splitter 116 and a plurality of ODF Ports 117A, 117B, 117C, etc. For example, the optical splitter 116 can be a 1:n splitter (where n is at least 2) that splits light coming from the NM Optical Interface 108 into n portions of light coupled into n optical ports, respectively. The optical ports (e.g., ODF Ports 117) can be coupled to one or more optical waveguides. In one implementation, each ODF Port 117 is coupled to an optical waveguide. The optical waveguides can be, for example, single mode or multimode fibers that guide received/transmitted light to/from respective ODF Ports 117A, 117B, 117C, etc. The 1:n splitter (or equivalently, n:1 combiner) also directs light from any of the ODF Ports 117A, 117B, 117C, etc. received over one of the optical waveguides to the NM Optical Interface 108. ODF Ports 117A, 117B, 117C, etc. include optical fiber connector sockets (e.g., SC, LC, FC, ST, or MU connector sockets) for coupling to the optical waveguides.

The ODF 102 can include any of a variety of passive optical components including optical fibers (e.g., single mode fibers, multimode fibers), optical connectors, fiber splices, passive branching components (e.g., passive splitters) and passive optical attenuators.

In this implementation, the NCAs 104 each include a network client communication logic and memory (NC-CLM) 120 block, a network client optical interface (NC Optical Interface) 122 block and an ODF port 124. The NC-CLM 120 block includes an Adaptation Unit 126 block, a network client engine (NC Engine) 128 block, a transmit framer (Framer) 130 block and a receiver framer (Deframer) 131 block. The NC Engine 128 is a control module that performs various functions associated with an NCA 104, such as responding to messages from the NM 100. The Framer 130 frames outgoing data from the NC Engine 128 in accordance with a framing protocol that is in-use. The Deframer 131 receives incoming frames and recovers appropriate data and messages to pass on to the NC Engine 128. The adaptation unit 126 receives and transmits data and messages in the form of frames, packets or cells according to one or more external protocol(s). External controls, data and messages can be received using the network interface 136. The responsibilities of the adaptation unit 126 may include providing buffering, data and/or message filtering and translation between the external protocol(s) and the protocol of the optical local area network 50. The adaptation Unit 126 includes egress queue 132 block and ingress queue 133 block. Egress and ingress queues 132, 133 can be of the form of memory and are used for buffering receive and transmit data and messages, respectively. The adaptation unit 126 can filter out or drop data and/or messages that are not intended to egress through its network interface 136. Filtering can be based on the destination address of the data and/or messages according to the external protocol in-use. Additionally, the adaptation unit 126 can filter out or drop data and/or messages that are not intended to ingress through its network interface 136. Filtering can be based on equal values for the source and destination addresses of the data and/or messages according to the external protocol in-use. The NC Optical Interface 122 is controlled by the NC-CLM 128 using bus 134. The NC Optical Interface 122 converts electrical signals carrying data from the Framer 130 block to optical signals, for example, by modulating a laser (not shown) included in the NC Optical Interface 122 and transmitting the laser output to the ODF port 124. The NC Optical Interface 122 also receives optical signals from the ODF port 124 and converts the optical signals to electrical signals carrying data that is then transferred to the Deframer 131 block. The ODF port 124 includes an optical fiber connector socket (e.g., an SC, LC, FC ST, or MU connector socket).

The NCAs 104 can be coupled to data link layer devices (not shown) or physical layer devices (not shown) using network interface 136. The data link layer devices and physical layer devices are network devices that operate at a Layer-2 or Layer-I respectively, according to the Open Systems Interconnect (OSI) 7-layer reference model. Furthermore, these network devices may comply with industry standard specifications such as IEEE 802.3 and Fibre Channel (incorporated herein by reference). Consequently, the network interface 136 may be an MII, GMII, XGMII, XAUI or SPI type interface. Other Layer-2 and Layer-I type interface specifications may also be used.

The optical local area network 50 transfers data between an NM 100 and the NCAs 104 in the form of downstream frames (NM 100 to NCAs 104) and upstream "virtual frames" (NCAs 100 to NM 104). Downstream frames from the NM 100 are transmitted into the ODF 102 in an essentially continuous sequence of constant period frames. In one implementation, downstream frames have a period of 125 μs, and transfer data downstream at a rate of approximately 10 Gb/s, although other periods and rates may be used. The ODF Interface 110 and potentially the ODF 102 split the downstream transmissions passively so that all NCAs 104 receive the frames in a generally broadcast manner. In the upstream direction, separate transmissions from the plurality of NCAs 104 are transmitted as burst transmissions or in slots which are combined in a virtual frame so that the separate burst transmissions do not collide when they arrive at the NM 100. In one implementation, the virtual upstream frames have essentially the same period as the downstream frames, and upstream data transmissions are transmitted at a rate approximately equal to the downstream rate. Alternatively, different upstream and downstream rates may be used.

Figure 2:
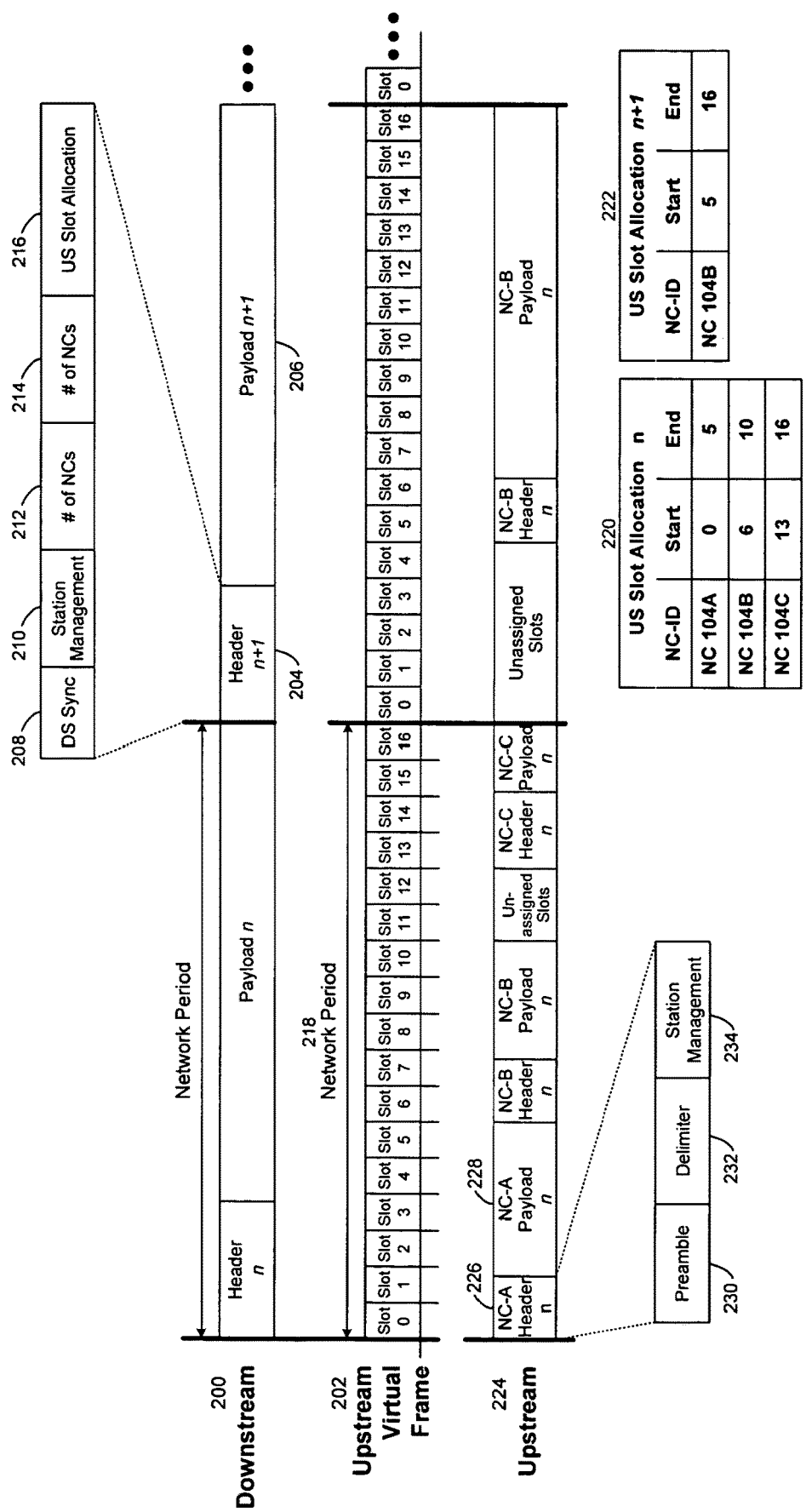
FIG. 2 is schematic diagram showing frame structures.

FIG. 2 is a schematic timing and framing diagram, showing overall structure of a downstream frame 200, and a virtual upstream frame 202 in an implementation of a framing protocol. Referring now to FIGS. 1 and 2, each downstream frame 200 includes a header 204 and a payload section 206. The downstream header 204 includes a downstream synchronization (DS Sync) 208 section, a station management 210 section, two sections containing the number of NCAs 104 in communication with the NM 100 (# of NCAs) 212, 214 and an upstream slot allocation (US slot allocation) 216 section. The DS Sync 208 section includes a consecutive sequence of bits that enables receiving NCAs 104 to identify a beginning of the downstream frame 200 and thus acts as starting marker for frame timing throughout the optical local area network 50. The number of NCAs 104 in communication with the NM is sent twice 212,214 to ensure correct interpretation of the US slot allocation section 216. The order of downstream header sections 210,212,214, 216 after a DS Sync 208 may differ in other implementations.

During each network period 218 defined by respective adjacent downstream headers, each NCA 104 is able to send upstream data. The virtual upstream frame 202 is partitioned into slots, where a "slot" corresponds to a fixed number of bits or a fixed length of time within a virtual frame. For each network period 218, the NM 100 allocates each NCA 104 respective slots within which an NCA is able to transmit data upstream. Each slot allocation includes a start slot number and end slot number (also referred to as start time and end time), relative to the starting marker defined by a DS Sync 208 from the next network period after an NCA 104 receives a slot allocation. In alternative implementations, a start slot number and a length of time during which a specific NCA 104 is permitted to transmit may be sent instead of a start slot number and an end slot number. Slot allocation start and end numbers are allocated within the virtual upstream frame so that slot allocations do not overlap, ensuring that there are no collisions of data from different NCAs 104 at the NM 100. The allocations can be determined by the NM Engine 112 based on total upstream bandwidth requests and can be communicated to NCAs 104 in the downstream frame US slot allocation 216 section. The US slot allocation 216 section includes start and end slot numbers pertaining to and identified to specific NCAs 104 (as shown in 220 and 222). Slot allocations assigned to NCAs 104 can be dynamic and may be changed from network period to network period.

The upstream frame 224 includes header 226 and payload 228 sections. The header 226 includes a preamble 230 section, a frame delimiter (Delimiter) 232 section and a station management 234 section. The preamble 230 section includes a consecutive sequence of bits designed to aid an NM 100 in synchronizing to the bit clock of a respective transmitting NCA 104. The Delimiter 232 includes a consecutive sequence of bits designed to aid an NM 100 in synchronizing to and recognizing the beginning of an upstream frame 224.

Figure 3A:
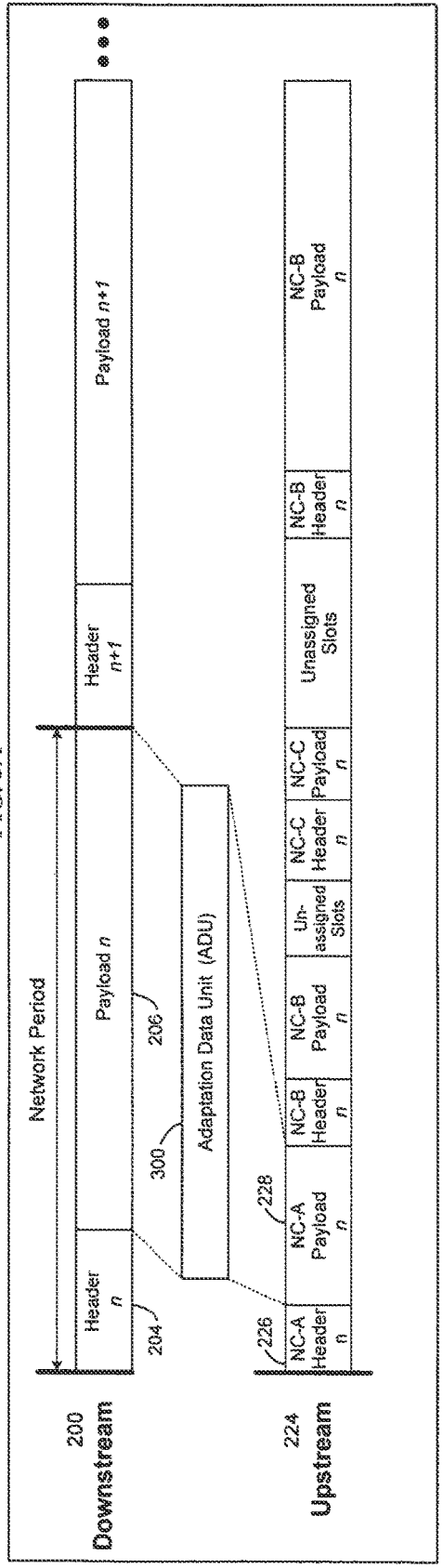
FIGS. 3A and 3B are schematic diagrams showing frame structures.

Each downstream frame 200 and upstream frame 224 includes a payload section 206, 228 respectively, in which data to and from NCAs 104 (from the network interface 136) are transferred. FIG. 3A is a schematic showing the payload in downstream and upstream framing, showing that the payload of both upstream and downstream may contain a single adaptation data unit (ADU) 300. ADUs 300 are output units of data from an adaptation unit 126, where the adaptation unit 126 has processed data received from the network interface 136 for transfer across the optical local network 50. For example, in one implementation the adaptation unit 126 receives Ethernet media access control frames (MAC frames) via a GMII interface (as an implementation for the network interface 136) and removes the MAC frame's preamble and start of frame delimiter (SFD) fields with the remaining fields of the MAC frame encapsulated in an ADU 300. Additionally, in one implementation the adaptation unit 126 receives Fibre Channel (FC) FC-2 frames through a serial interface (as an implementation of the network interface 136) and removes the FC-2 frame's start of frame and end of frame fields with the remaining fields of the FC-2 frame encapsulated in an ADU 300.

In another example, the adaptation unit 126 can receive IEEE 802.3 MAC frames via a GMII interface and form an ADU 300 with the entire MAC frame included (i.e., encapsulate the entire MAC frame). In yet another example, the adaptation unit 126 can receive FC-2 frames through a serial interface (as an implementation for the network interface 136) and form an ADU 300 with the entire FC-2 frame included (i.e., encapsulate the entire FC-2 frame).

Figure 3B:
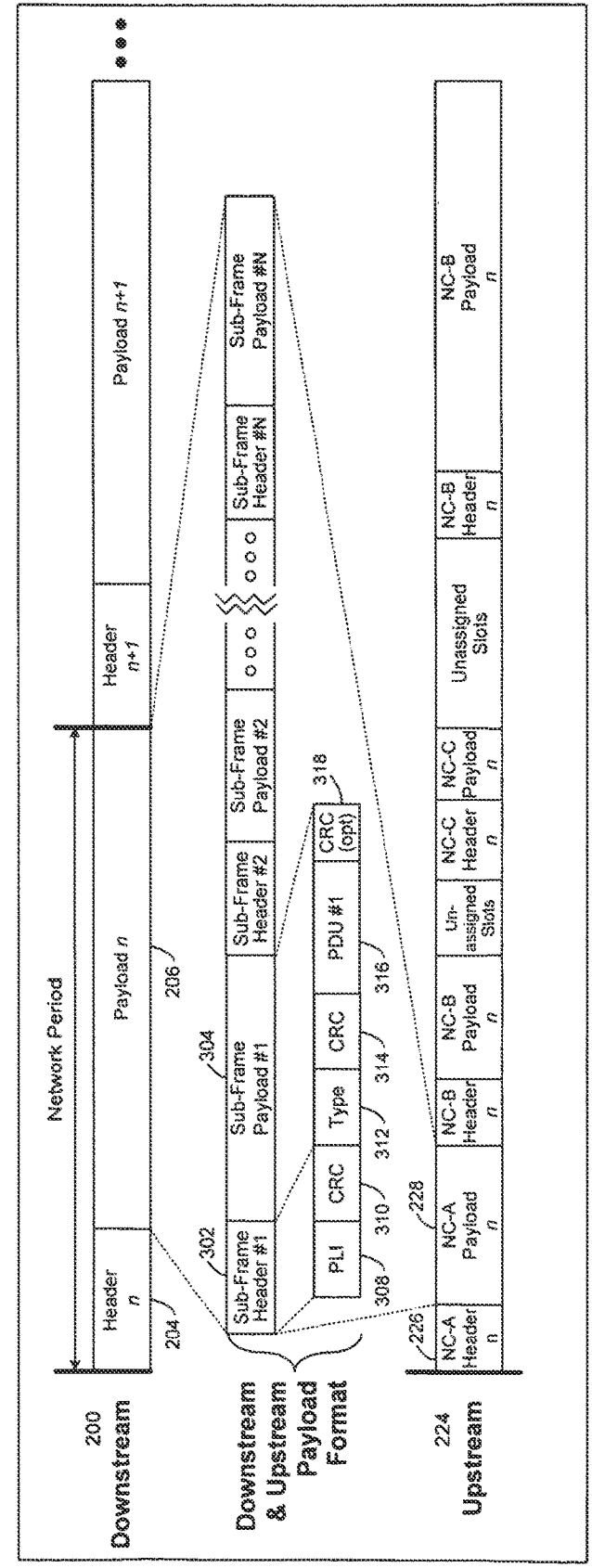

In one implementation, the payload 204, 232 of downstream frames 200 and upstream frames 224 may include multiple consecutive sub-frames. Referring to FIGS. 1 and 3B, a sub-frame includes a sub-frame header 302 section and a sub-frame payload 304 section. A sub-frame header 302 section includes a payload length indicator (PLI) 308 and cyclic redundancy check (CRC) 310 section that covers the PLI 308. CRC sections, although not shown, may be used in the downstream 200 and upstream 224 frames as well. The sub-frame payload 304 section includes a type 312 section, a CRC 314 that relates to the type 312 section, a payload data unit (PDU) 316 and optionally a CRC 318 that relates to the PDU 316. The PLI 308 gives an indication of the length, e.g., in bits, of the sub-frame payload 304 section immediately following the sub-frame header 302. The type 312 section gives an indication of the type of data in the PDU 316. An adaptation unit 126 may receive data from a mixture of protocols essentially simultaneously (as described below) and the use of sub-frames allows the data to be transferred across the network ensuring quality of service or class of service. An adaptation unit 126 uses sub-frames by placing received data in the PDU 316, indicating the type of data received in the type 312 section and entering the length of the sub-frame payload 304 in the PLI 308 section.

Figure 4:
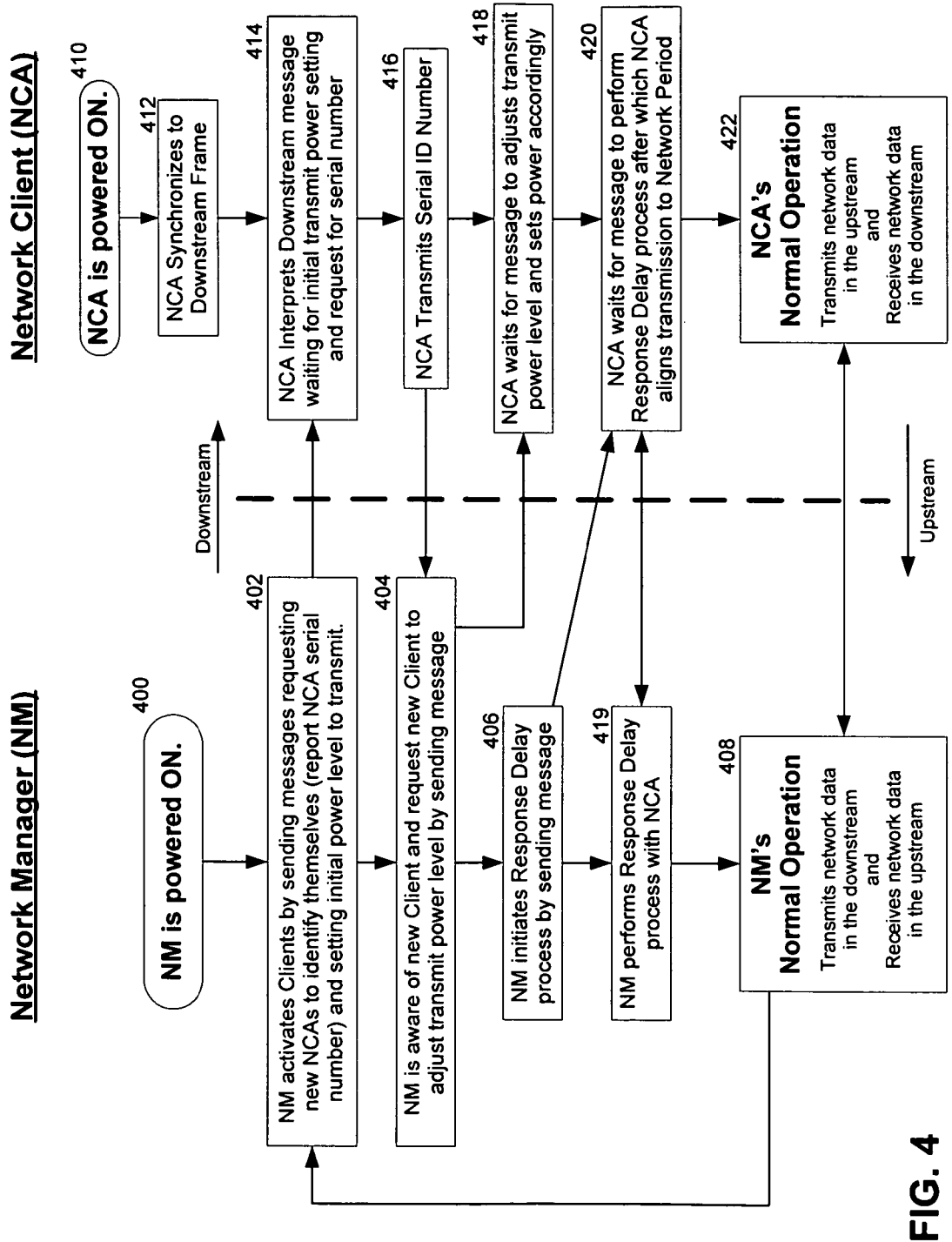
FIG. 4 is a flowchart for a network operating process.

The optical local area network 50 operates according to an exemplary process illustrated in FIG. 4. Referring now to FIGS. 1 and 4, after an NM 100 is powered on 400, the NM 100 sends out 402 one or more message(s) requesting new NCAs 104 (NCAs 104 that the NM 100 is unaware of) to identity themselves by reporting to the NM 100 with their respective serial number. The NM 100 also sends out 402 network parameters including initial NCA transmit power levels using, for example, a station management message(s). The NCAs 104 respond using slot allocation(s) given by the NM 100 for new NCAs 104 to respond. After successfully receiving new NCA serial numbers, the NM 100 assigns each new NCA 104 a network identification number (NC-ID) and requests 404 the new NCA 104 to adjust its transmitting power level. In one implementation, the NM 100 sends these requests in a station management message. The respective new NCAs 104 use the assigned NC-ID to interpret specific messages of concern (i.e., addressed) to a given NCA 104. The NM 100 initiates 406 a response delay process to determine the delay in responses between the new NCA and the NM 100. After performing 419 the response delay process, the NM 100 enters normal operation in which network data is transmitted and received 408 across the optical local area network 50.

When an NCA 104 is powered on 410, the NCA 104 attempts to synchronize 412 to downstream frames by searching for the DS Sync 208. After successful downstream synchronization, the NCA 104 interprets 414 network parameters received via downstream station management messages 404, adjusts its initial transmit power level and awaits instructions (e.g., a message) for new NCAs 104. The instructions include a slot allocation for new NCAs 104 to respond 416 to the NM 100 with the NCA's 104 serial number. Once the NCA 104 has sent its serial number the NCA 104 is then assigned an NC-ID by the NM 100. The NCA 104 then enters a waiting loop (e.g., for a station management message from the NM 100 to adjust its transmit power level). In response to a request to set transmit power level, the NCA 104 adjusts the transmit power level 418. The NCA 104 then enters a waiting loop again (e.g., until receipt of a message from the NM 100 to initiate a response delay process). Upon receipt of an instruction to begin a response delay process, the NCA 104 can, in cooperation with the NM 100, determine the delay between the respective network elements (not shown as part of the process flow). The details of the response delay process are described in greater detail below. After the NCA 104 and NM 100 complete the response delay process, the NCA 104 may adjust 420 its alignment with the network period to account for downstream and upstream transmission delay. The NCA 104 then enters its normal operation state in which network data is received and transmitted 422.

Figure 5:
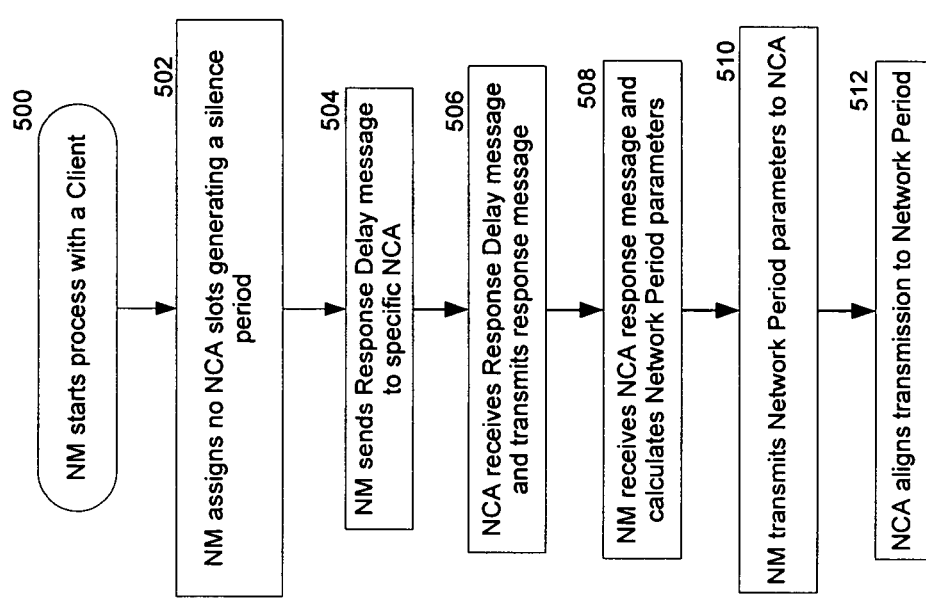
FIG. 5 is a flowchart for a response delay process.

FIG. 5 shows one implementation for executing a response delay process 500. The response delay process 500, is a process to determine the delay in NM downstream transmission to NM upstream reception of a message or network data transmission. Referring now to FIGS. 1, 2 and 5, the NM 100 starts 501 the delay process with a new NCA 104 or with an NCA 104 that may cause upstream transmission collisions. The NM 100 assigns one or more slot(s) to the target NCA 104 (i.e., the new NCA or one NCA that may cause a collision in upstream communication) to respond with a response delay message. The NM 100 generates 502 a silence period in the upstream virtual frame 202 (e.g., by not assigning or granting any slots for that period) around the slot(s) assigned to the target NCA 104. The silence period ensures no upstream collisions will occur. The NM 100 sends 504 a message to the NCA 104 to respond with a response delay message and informs the NCA 104 of its slot(s) assignment to respond. Thereafter, the NCA 104 responds 506 to the NM 100 at the appropriate slot time. The NM 100 receives the NCA 104 response delay message and calculates 508 the transmission delay. In one implementation, the NM 100 transmits 510 the result of the response delay calculation to the NCA 104 and the NCA 104 aligns 512 itself to the proper network period.

The NM 100 may assign, schedule or grant slot allocations in a number of ways (e.g. according to fixed time-division multiplex or statistical time-division multiplex schemes). In one implementation the slot allocations are scheduled to give the NCs 104 a guaranteed minimum upstream transfer rate. The rate may be determined by dividing the maximum upstream data rate by the number of NCAs 104. In another implementation, the NM 100 receives status information about the NCAs 104 egress 132 and ingress 133 queue status. The NM 100 can schedule slot allocations that best minimize the depth of the egress 132 and ingress 133 queues to minimize transmission delays ensuring quality of service (QOS) or class of service (COS).

FIGS. 6A-6C, 7A-7C and 8 are illustrations of implementations of the optical local area network 50. In one implementation shown in FIG. 6A, an NM 100 may function in a hub configuration 600 networking clients including workstations 602, personal computers (PC) 604 and Ethernet switches 618 together using the Ethernet protocol. The workstations 602 and PCs 604 are connected to the hub configuration 600 with a network interface card (NIC) 606 containing an NCA 104 and a NIC controller 608. In one implementation of the NIC 606, the NIC controller 608 includes a GMII interface, an Ethernet MAC and a peripheral component interconnect (PCI) bus interface. The NCA 104 communicates to the NIC controller 608 through the GMII interface. Ethernet switches 618 are connected to the hub configuration 600 with a network adaptor 621A containing an NCA 104. Ethernet switches 618 can be conventional Ethernet switches. In one implementation of the network adaptor 621A, the network interface 136 is a GMII interface.

Figure 6A:
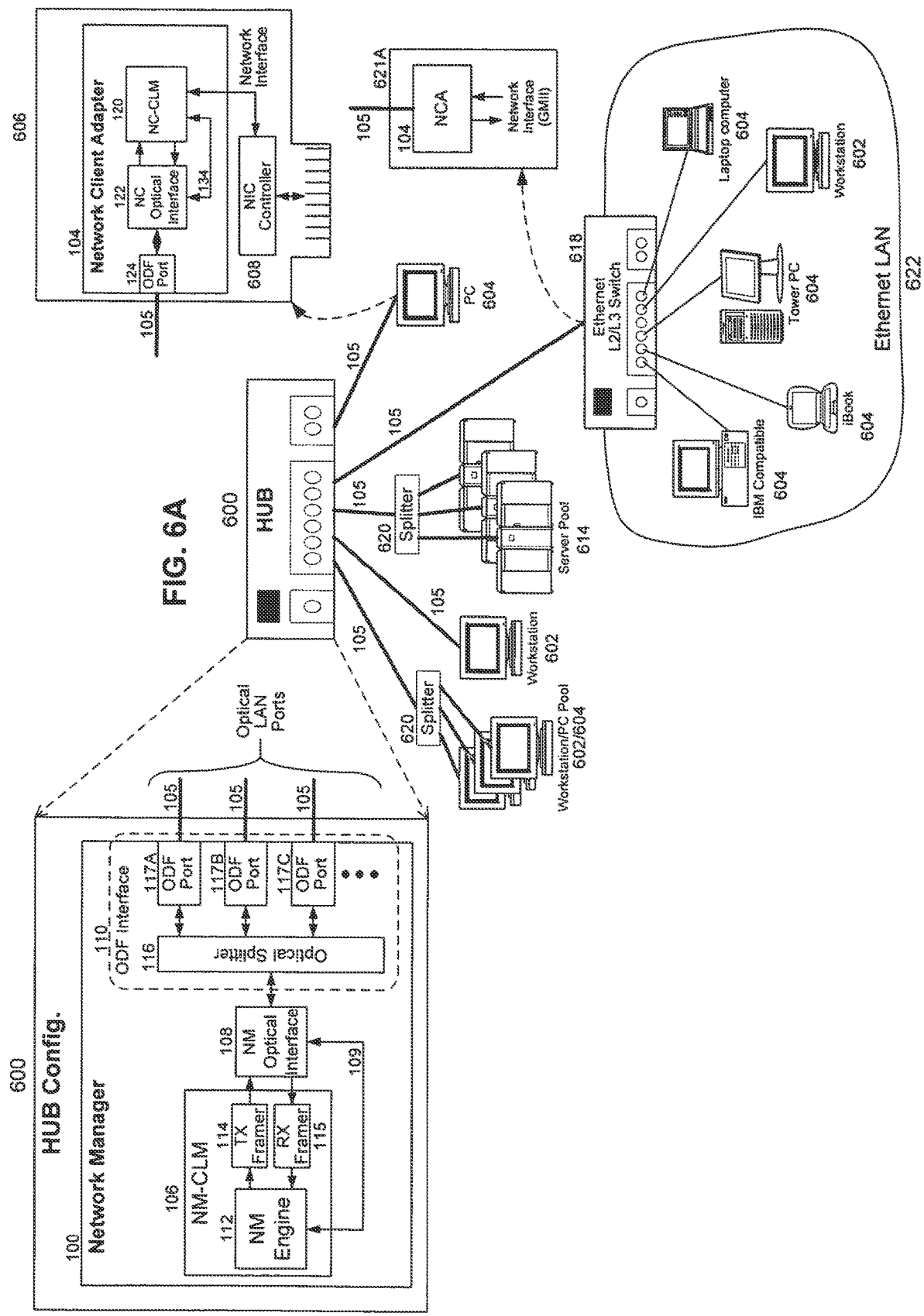
FIGS. 6A-6C are diagrams of optical local area networks utilizing a hub configuration
Figure 6B:
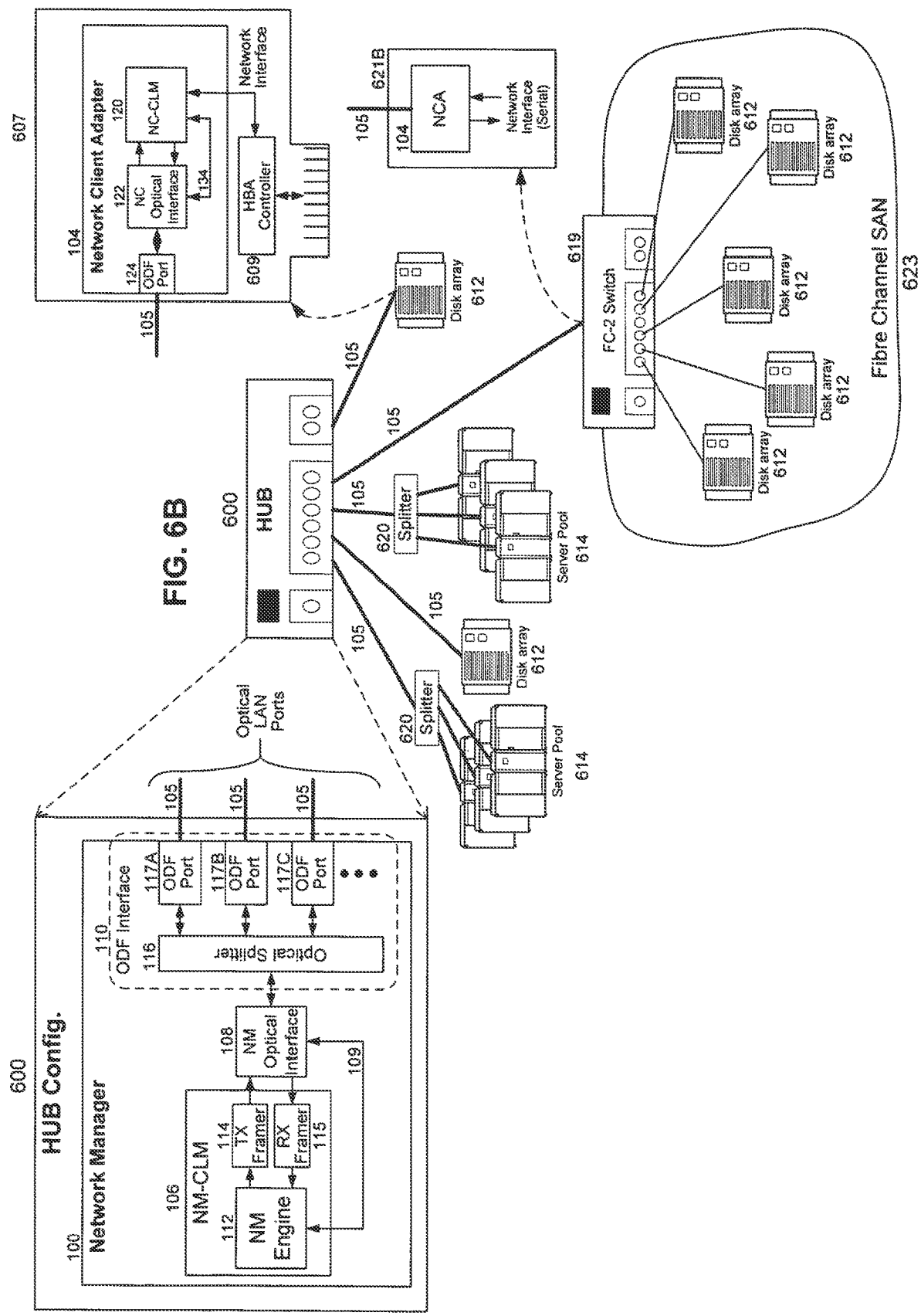

In another implementation shown in FIG. 6B, the hub configuration 600 can network disk storage array devices 612, servers 614 and FC switches 619 together using the Fibre Channel (FC) protocol. This implementation may be described as a Storage Area Network (SAN). The disk storage array devices 612 and servers 614 are connected to the hub configuration 600 with a host bust adaptor (HBA) 607. In one implementation of HBA 607, the HBA controller 609 includes a serial interface, FC controller and a PCI bus interface. FC switches 619 are connected to the hub configuration 600 with a network adaptor 621B containing an NCA 104. FC switches 619 can be conventional FC switches. In one implementation of the network adaptor 621B, the network interface 136 is a serial interface.

Figure 6C:
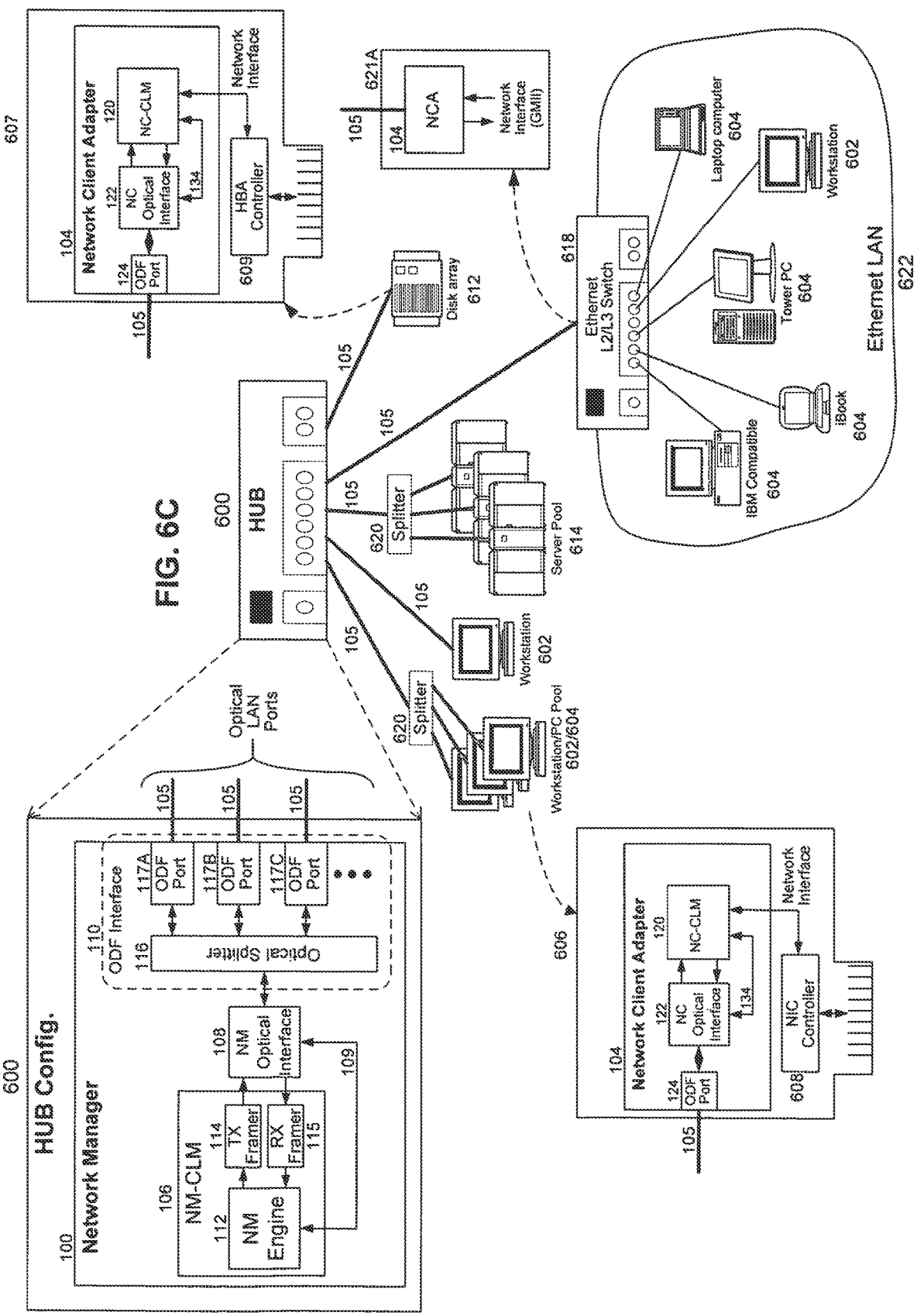

In yet another implementation of the optical local area network 50 shown in FIG. 6C, the hub configuration 600 may network clients such as workstations 602, PCs 604, disk storage array devices 612, servers 614 and switches 618,619 (FIG. 6B) using both Ethernet and FC protocols concurrently. NICs 606 can connect a particular client to the hub configuration 600 using the Ethernet protocol. HBAs 607 can connect a particular client to the hub configuration 600 using the FC protocol. For example, workstations 602, PCs 604 and switches 618 can communicate with the hub configuration 600 using Ethernet protocol while disk storage array devices 612 and servers 614 can communicate with the hub configuration 600 using FC protocol. The ODF 102 (not shown) of the optical local area network 50 can include splitters 620. Hub configuration 600 can also connect to a switch 618 using an adaptor card 621A. Adaptor card 621A includes an NCA 104 with a respective network interface 136 (e.g., GMII, XAUI, Serial). Switch 618 may be, for example, a switch in a conventional Ethernet LAN 622.

Figure 7A:
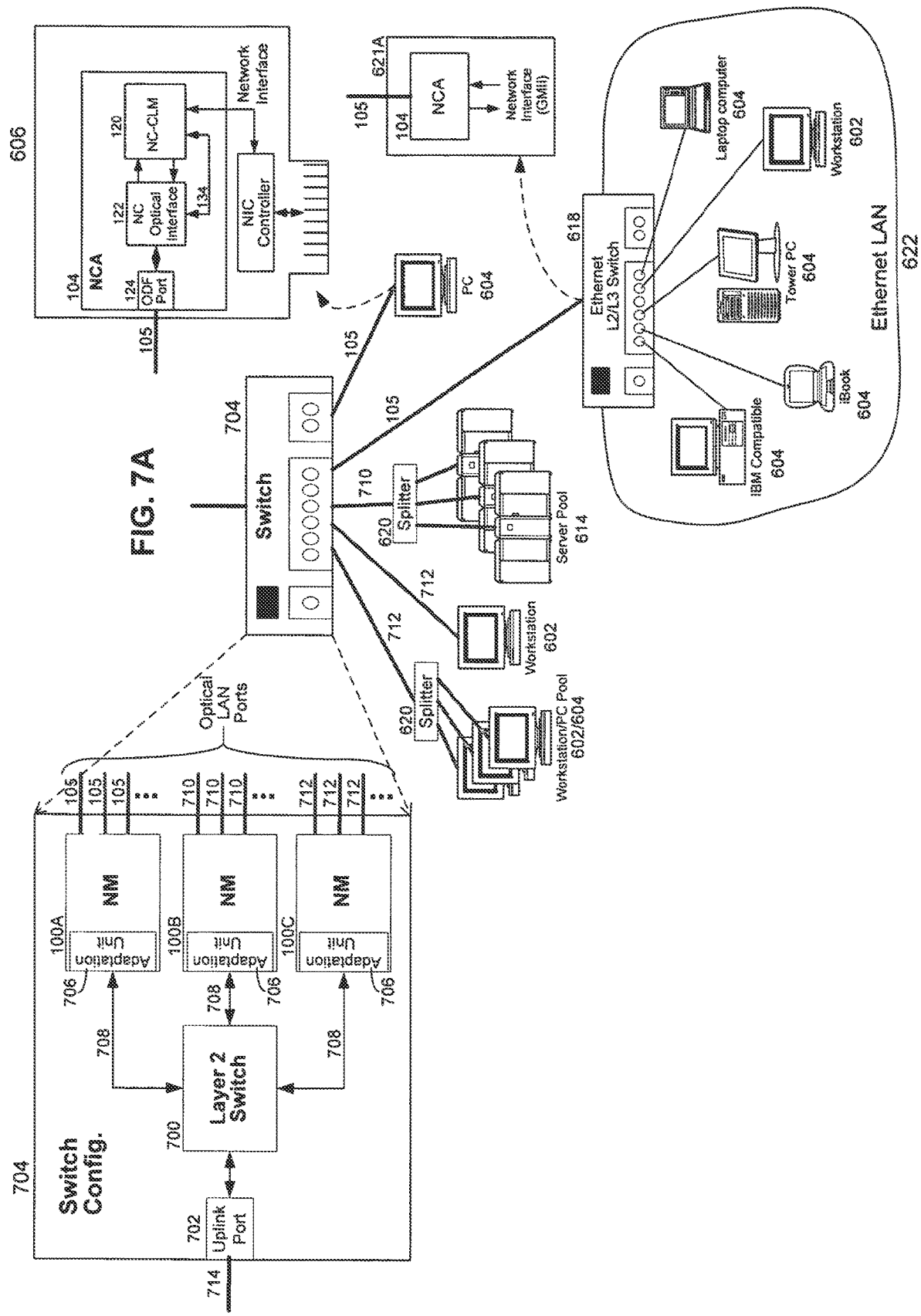

One or more NMs 100 can interface to a switching device (e.g., a Layer-2 switch or a Layer-3 switch) to process frames from the various NCAs 104 according to a communication protocol of the switching device. Referring to FIG. 7A, a switch configuration 704 includes multiple NMs 100A, 100B, 100C in communication with a Layer-2 switch device 700 which is in further communication with an uplink port 702. In alternative implementations, the Layer-2 switch device 700 may be in communication with a plurality of uplink ports (not shown). Though three NMs 100A, 100B, 100C are shown more or fewer NMs 100 may be in communication with a Layer-2 switch device 700 included in the switch configuration 704. Each NM 100A, 100B, 100C includes an adaptation unit 706 in communication with a NM Engine (not shown). The adaptation unit 706 receives and transmits data and messages in the form of frames, packets or cells according to the Layer-2 switch device 700 via a switch interface 708. Adaptation unit 706 can provide buffering, data and/or message filtering and translation between the protocol of the Layer-2 switch device 700 and the protocol of the optical local area network 50. The adaptation unit 706 includes an egress queue block (not shown) and an ingress queue block (not shown). Egress and ingress queues can be of the form of memory and are used for buffering receive and transmit data and messages, respectively. In one implementation of the NMs 100A, 100B, 100C, all upstream traffic received by an NM 100 is passed through the switch interface 708 to the Layer-2 switch device 700. All downstream traffic transmitted by an NM 100 is received by the NM 100 through the switch interface 708. In another implementation upstream traffic received by an NM 100 can be filtered based on destination address to either pass data and/or messages back to one or more NCAs 104 multiplexed in downstream traffic (e.g. hairpinning) or to the Layer-2 switch device 700 through the switch interface 708. The fiber connections 105 form a first ODF for connecting NM 100A with one or more NCAs. The fiber connections 710 form a second ODF for connecting NM 100B with one or more NCAs. The fiber connections 712 form a third ODF for connecting NM 100C with one or more NCAs.

In one implementation of an optical local area network 50 shown in FIG. 7A, the switch configuration 704 is used to network workstations 602, PCs 604 and a Ethernet switch 618 together using the Ethernet protocol with appropriate NICs 606 as described above. The switch configuration 704 includes a Layer-2 switch (e.g., Layer-2 switch device 700) that implements an Ethernet MAC and switching functions. The optical fibers 105, 710, 712 connecting the workstations 602, PCs 604 and Ethernet switches 618 to the switch configuration 704 can be associated with different NMs 100A, 100B, 100C depending on which fiber connections are used. The uplink port 702 of switch configuration 704 can connect to an Ethernet switch and/or router (not shown).

Figure 7B:
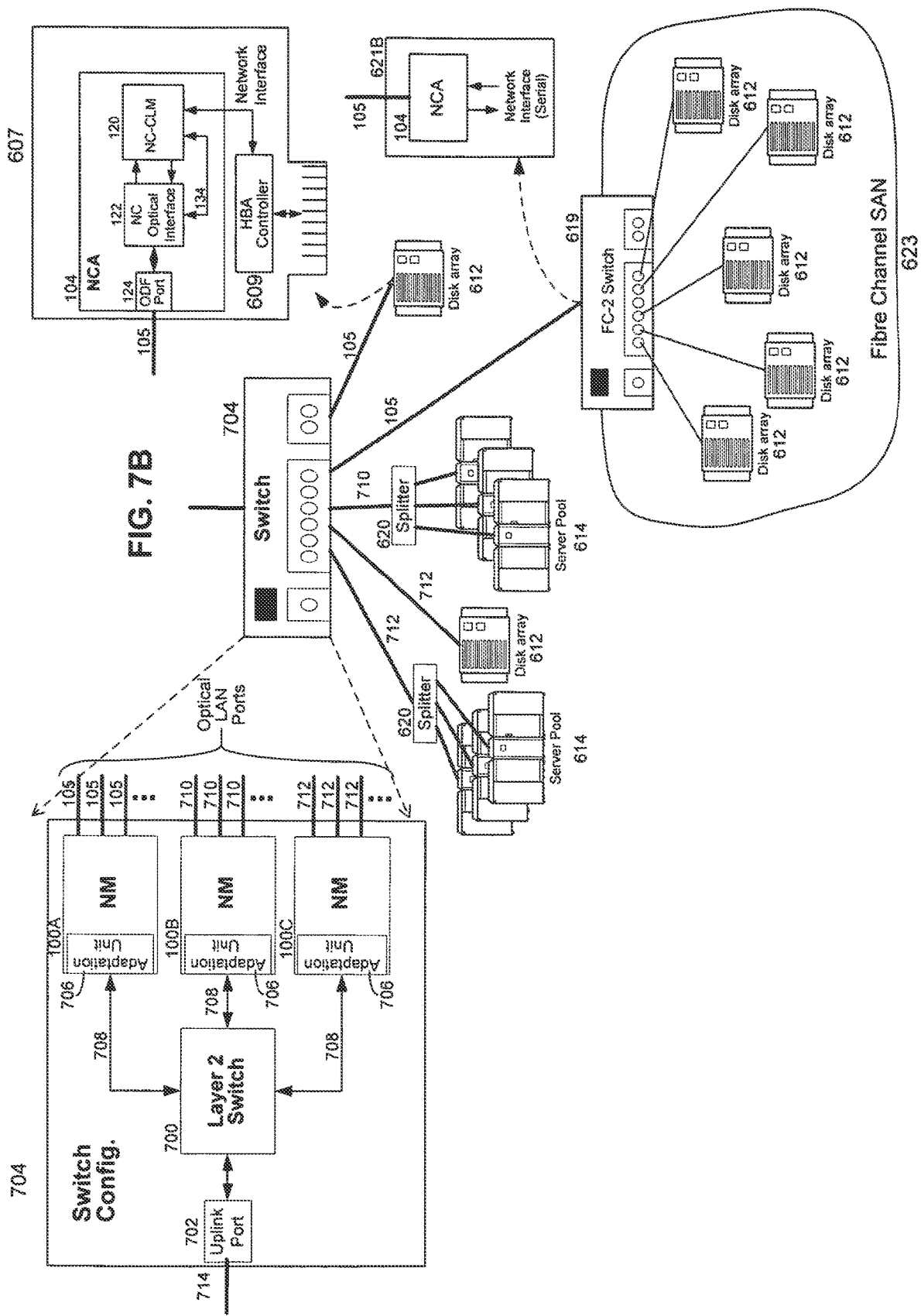

In another implementation of an optical local area network 50 shown in FIG. 7B, the switch configuration 704 is used to network one or more disk storage array devices 612, servers 614 and FC-2 switches 619 using, for example, the FC protocol with appropriate HBAs 607 as described above. This implementation may also be described as a Storage Area Network (SAN). The switch configuration 704 includes a Layer-2 switch (e.g., Layer-2 switch device 700) that implements an FC-2 controller and switching functions. The optical fibers 105, 710, 712 connecting the disk storage array devices 612, servers 614 and FC-2 switch 619 to the switch configuration 704 can be associated with different NMs 100A, 100B, 100C depending on which fiber connections are used. The uplink port 702 of switch configuration 704 may connect to an FC-2 switch and/or router (not shown). FC-2 switches 619 can be a conventional FC-2 switch.

In yet another implementation of an optical local area network 50 shown in FIG. 7C, a switch configuration 704 is used to network workstations 602, PCs 604, 'disk storage array devices 612, servers 614 and other switches (e.g. an Ethernet switch 618) together using, for example, both Ethernet and FC protocols concurrently in a manner described previously. The switch configuration 704 includes a Layer-2 switch (e.g. Layer-2 switch device 700) that implements both an Ethernet MAC and FC-2 controller with switching functions. Layer-2 switch device 700 can be implemented by a packet processor or network processor. The optical fibers 105, 710, 712 connecting the workstations 602, PCs 604, disk storage array devices 612, servers 614 and t switches to the switch configuration 704 can be associated with different NMs 100A, 100B, 100C depending on which fiber connections are used. The uplink port 702 of switch configuration 704 may connect to an Ethernet or FC-2 switch and/or router (not shown).

Figure 7D:
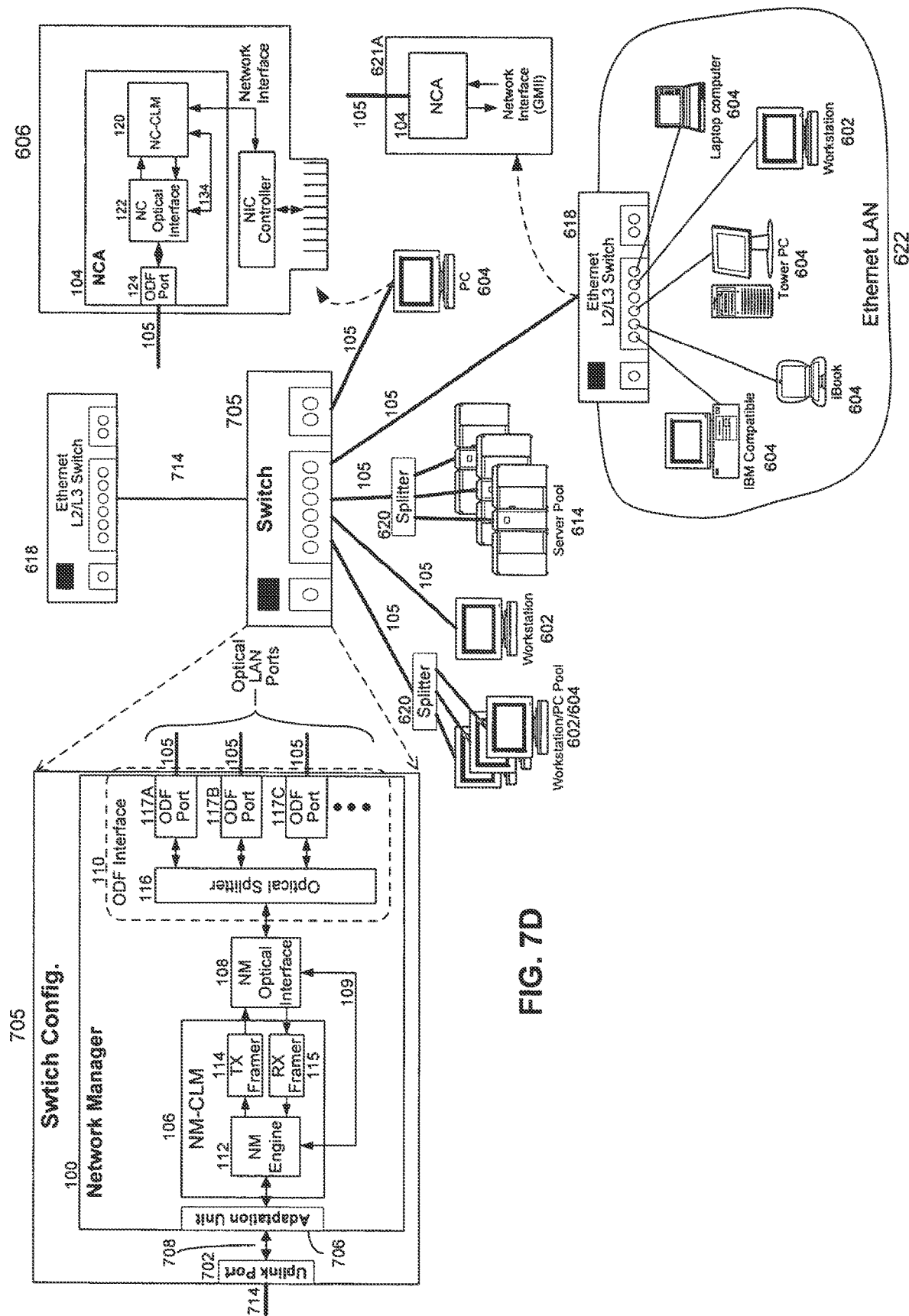

In yet another implementation of an optical local area network 50, an implementation of switch configuration 705 containing an NM 100, an adaptation unit 706 and an uplink port 702 is shown in FIG. 7D. Switch configuration 705 can be used to network workstations 602, PCs 604 and other switches 618 in a manner described previously. The NM 100 is in communication with a Layer-2 switch device (not shown) through the uplink port 702 that is connected to a switch. The connection between uplink port 702 and switch 618 can be a physical layer connection 714 (e.g., 1000 BASE-SX, 1000 BASE-LX). Ethernet switch 618 can be a conventional Ethernet switch.

In some implementations of switch configurations 704, 705 the uplink port 702 can be an NCA adaptor (not shown) similar to 621A, 621B wherein the network interface 136 and switch interface 708 are coupled using the same interface standard (e.g., XAUI, Serial, Parallel), thus enabling the uplink port 702 to connect to other hub configurations 600 and switch configurations 704 (FIGS. 7A-7C), 705 (FIG. 7D).

Figure 8:
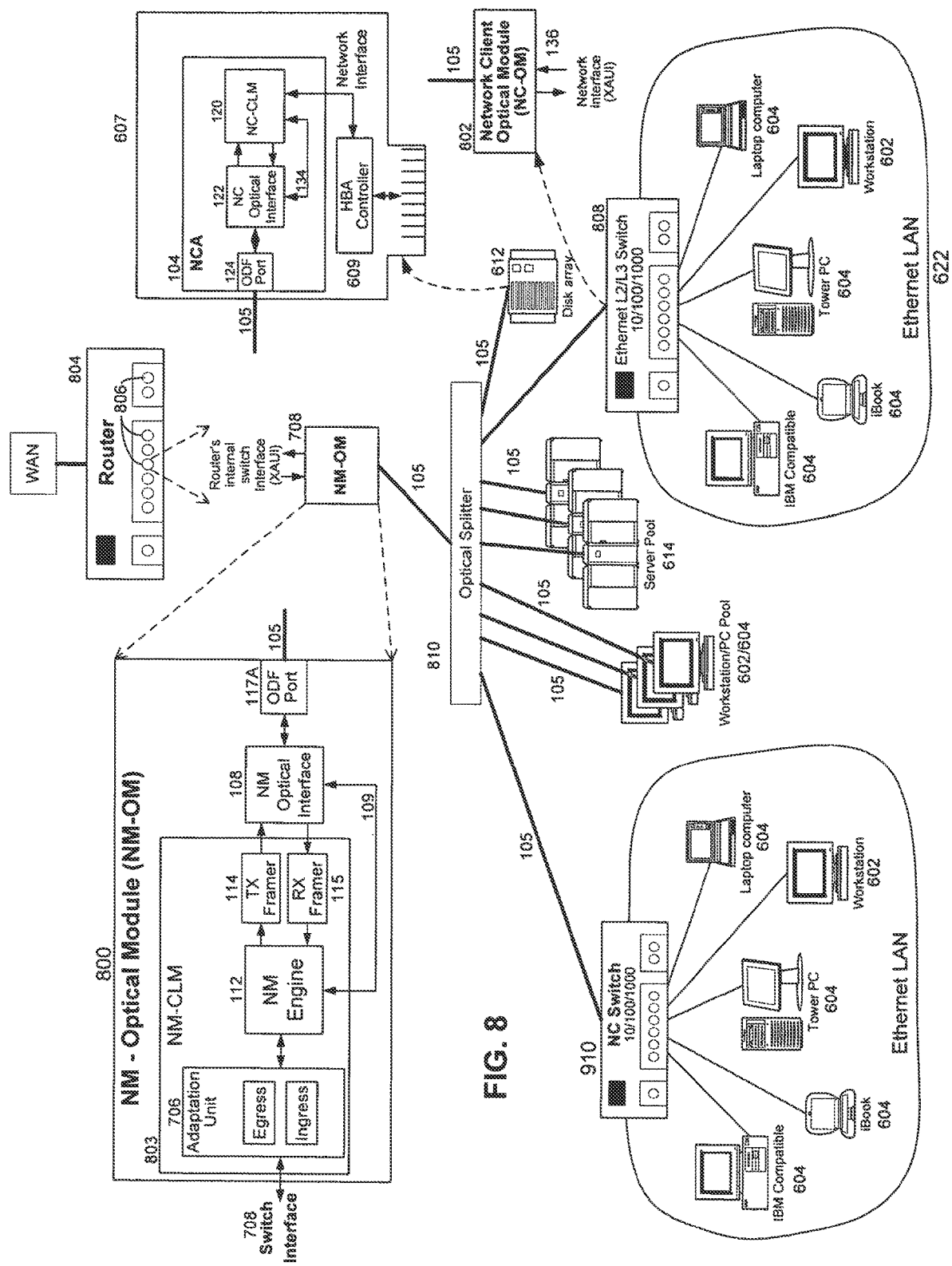
FIG. 8 is a diagram of an optical local area network.

In another implementation of an optical local area network 50 shown in FIG. 8, NM 100 and NCA 104 may be implemented in optical modules. A network manager in an optical module (NM-OM) 800 is provided that, in one implementation, conforms to an industry standard form factor and includes an NM-CLM 803 that includes an adaptation unit 706 to transfer data into and out of a network interface (e.g., switch interface 708). The NM-OM 800 also includes a NM Optical interface 108 and an ODF port 117A. In one implementation, the optical module NM-OM 800 conforms to an industry standard Multi-source agreement (MSA) form factor (e.g., 300pin, XENPAK, X2, XPAK, XFP or SFP). A network client adaptor in an optical module (NC-OM) 802 can be provided that, in one implementation, also conforms to an industry standard form factor and includes an NCA 104. For example, the optical module NC-OM may conform to an MSA form factor (e.g., 300pin, XENPAK, X2, XPAK, XFP or SFP).

The NM-OM 800 can connect to a conventional router 804 that has optical module ports 806 using the router's switch interface (e.g., XAUI or Serial). The NM-OM 800 is in optical communication with an optical splitter 810 that splits light among and collects light from workstations 602, PCs 604, disk storage array devices 612, servers 614 and switches using appropriate NICs 606 and/or NC-OM 802 as previously described. The Ethernet Layer-2/3 switch 808 may be of conventional design and include an uplink port, that in one implementation, conforms to an industry standard optical module form factor. The Ethernet Layer-2/3 switch 808 can communicate with the NM-OM 800 in router 804 by using an NC-OM 802 via network interface 136 (e.g., XAUI or Serial).

Figures 9A, 9B:
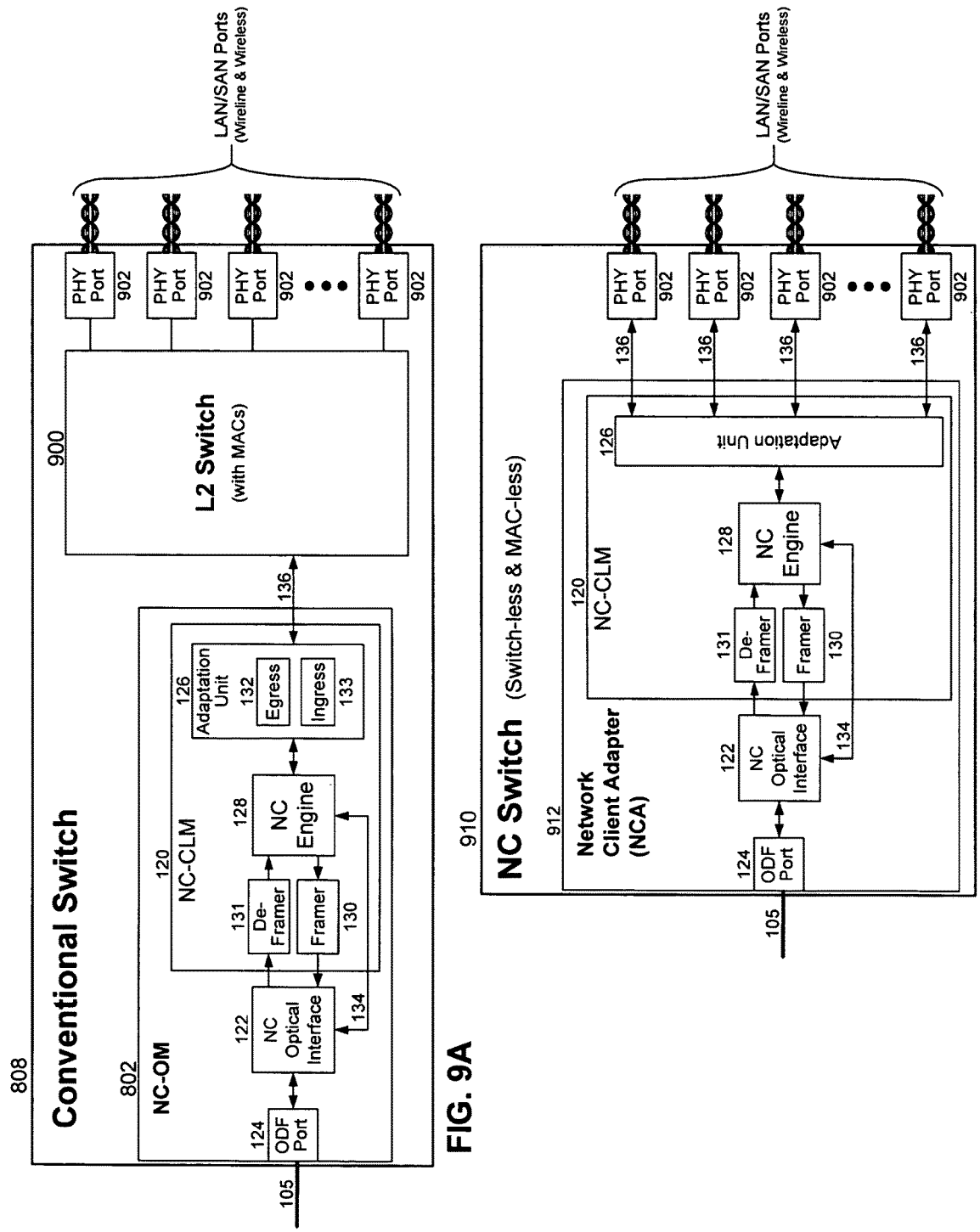
FIGS. 9A and 9B are block diagrams of switches.

The Ethernet Layer-2/3 switch 808 is further detailed in FIG. 9A. In the Ethernet Layer-2/3 switch 808, an NC-OM 802 is in communication with a Layer-2 switch 900 by means of a MAC (not shown) using a network interface 136 (e.g., XAUI or Serial). Ethernet Layer-2/3 switch 808 also includes physical layer ports (PHY ports) 902 that, in one implementation, form a conventional Ethernet LAN (e.g., Ethernet LAN 622 of FIG. 8) connecting network clients such as workstations 602 and PCs 604.

An implementation of an alternative configuration for a switch is shown in FIG. 9B. FIG. 9B is an illustration of an NC-Switch 910, in which no conventional Layer-2 switch and MAC is used. NC-Switch 910 includes an NCA 912 and multiple PHY ports 902. Each PHY port may perform wireline (e.g., 10/100/1000 BASE-T, DSL) or wireless (e.g., IEEE 802.11, IEEE 802.16) physical layer communications with conventional LAN clients. In this implementation, the adaptation unit 126 supports multiple network interfaces 136. The switching function previously performed by the Layer-2 switch (e.g., Layer-2 switch 900 of FIG. 9A) is consolidated to the switch or router in communication with an NM 100 in a switch configuration 704 (as described above) or an NM-OM 800 (e.g. as illustrated in FIG. 8 an NC-Switch 910 in communication with an NM-OM 800). Alternatively, the switching function previously performed by the Layer-2 switch is consolidated to Layer-2 switches (not shown) in communication with other NCAs 104 networked in a hub configuration 600.

In hub configuration 600 (e.g. FIGS. 6A-6C) of the optical local area network 50, flow control, denial of service and other network administration functions are dependent on external Layer-2 devices in communication with NCAs 104 (for example, the Ethernet MAC or FC-2 controller in the NIC controller 608 dependent on the implementation as previously discussed). In switch configurations 704 (e.g. FIGS. 7A-7C) of the optical local area network 50, flow control, denial of service and other network administration functions are further dependent on the external Layer-2 device 700 in communication with NMs 100, in addition to the Layer-2 devices external and in communication with NCAs 104 as previously mentioned.

Although the invention has been described in terms of particular implementations, one of ordinary skill in the art, in light of this teaching, can generate additional implementations and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for a Local Area Network (LAN) Manager for managing the communications of a passive optical local area network, wherein the passive optical local area network is disposed to further include a plurality of LAN clients, at least one passive optical splitter, and a plurality of optical fibers, the method for the LAN Manager for managing the communications of the passive optical local area network comprising:

receiving one or more user data communications through an electrical interface of the LAN Manager;

processing at least a portion of the one or more user data communications according to an Open Systems Interconnect (OSI) Layer 3 protocol;

transmitting a downstream optical signal on a downstream wavelength through an optical interface of the LAN Manager wherein the downstream optical signal includes downstream control and downstream data information, wherein the downstream control information includes upstream bandwidth allocations for one or more LAN clients, wherein the downstream data information includes at least a portion of the one or more user data communications, and wherein the optical interface of the LAN Manager is disposed to couple to one of the plurality of optical fibers;

receiving an upstream optical signal on an upstream wavelength through the optical interface of the LAN Manager responsive to the upstream bandwidth allocations, and wherein the upstream optical signals include upstream control and upstream data information; and processing at least a portion of the upstream data information to perform switching function at Open Systems Interconnection (OSI) Layer 2, wherein the portion of the upstream data information includes an OSI Layer 2 destination address, whereby upstream data information received from a first LAN client can be transmitted in the downstream data information to a second LAN client responsive to a destination address in the upstream data information.

2. The method for the LAN Manager for managing the communications of the passive optical local area network of claim 1, wherein the processing the upstream data information includes using a switching device that operates at OSI Layer 2.

3. The method for the LAN Manager for managing the communications of the passive optical local area network of claim 2, wherein the switching device receives at least a portion of an upstream data information.

4. The method for the LAN Manager for managing the communications of the passive optical local area network of claim 2, wherein the switching device switches data using OSI Layer 2 addresses.

5. The method for the LAN Manager for managing the communications of the passive optical local area network of claim 2, wherein the switching device is an Ethernet switch device.

6. The method for the LAN Manager for managing the communications of the passive optical local area network of claim 5, wherein the Ethernet switch device includes an Ethernet media access controller (MAC).

7. The method for the LAN Manager for managing the communications of the passive optical local area network of claim 1, wherein the processing at least a portion of the one or more user data communications according to an OSI Layer 3 protocol includes using an OSI layer 3 processing device.

8. The method for the LAN Manager for managing the communications of the passive optical local area network of claim 1, wherein an upstream bandwidth allocation includes one or more start and end time slot numbers for one or more LAN clients.

9. The method for the LAN Manager for managing the communications of the passive optical local area network of claim 1, wherein an upstream bandwidth allocation includes one or more start time and length of time for one or more LAN clients.

10. The method for the LAN Manager for managing the communications of the passive optical local area network of claim 1, further comprising hairpinning one or more upstream data information onto one or more downstream data information based on destination address.

11. A method for a Local Area Network (LAN) Manager for managing the communications of a passive optical local area network, wherein the passive optical local area network is disposed to further include a plurality of LAN clients, at least one passive optical splitter, and a plurality of optical fibers, the method for the LAN Manager for managing the communications of the passive optical local area network comprising:
  receiving one or more user data communications through an electrical interface of the LAN Manager;
  processing at least a portion of the one or more user data communications according to an Open Systems Interconnect (OSI) Layer 3 protocol;
  transmitting a downstream optical signal on a downstream wavelength through an optical interface of the LAN Manager wherein the downstream optical signal includes downstream control and downstream data information, wherein the downstream control information includes upstream bandwidth allocations for one or more LAN clients, and wherein the downstream data information includes at least a portion of the one or more user data communications;
  receiving an upstream optical signal on an upstream wavelength responsive to the upstream bandwidth allocations and wherein the upstream optical signal includes upstream control and upstream data information; and
  processing at least a portion of the upstream data information to perform Ethernet switching, wherein the portion of the upstream data information includes an Ethernet destination address, whereby
  upstream data information received from a first LAN client can be transmitted in the downstream data information to a second LAN client responsive to an Ethernet destination address in the upstream data information.

12. The method for the LAN Manager for managing the communications of the passive optical local area network of claim 11, wherein Ethernet switching includes using an Ethernet switch device.

13. The method for the LAN Manager for managing the communications of the passive optical local area network of claim 12, wherein the Ethernet switch device includes an Ethernet media access controller (MAC).

14. The method for the LAN Manager for managing the communications of the passive optical local area network of claim 11, wherein the processing at least a portion of the one or more user data communications according to an OSI Layer 3 protocol includes using an OSI Layer 3 processing device.

15. The method for the LAN Manager for managing the communications of the passive optical local area network of claim 14, wherein the OSI Layer 3 processing device communicates with the Ethernet switch device.

16. A Local Area Network (LAN) Manager for a local area passive optical network whereby the local area passive optical network is disposed to include a plurality of LAN clients, the LAN Manager comprising:
  an optical interface to convert a downstream electrical signal to emit a downstream optical signal on a downstream wavelength, and the optical interface can receive an upstream optical signal on an upstream wavelength and convert the upstream optical signal to an upstream electrical signal, and wherein the optical interface is disposed to couple to an optical fiber;
  a control module for managing the optical signals, wherein the control module is electrically coupled to the optical interface, and wherein the control module includes sending downstream control and data information in the downstream electrical signal, and wherein the downstream control information includes an upstream bandwidth allocation information for one or more LAN clients, and wherein the control module receives the upstream electrical signal that includes upstream control and data information;
  an OSI Layer 2 switch device for switching data according to an OSI Layer 2 protocol, and wherein the OSI Layer 2 switch device is electrically coupled to the control module;
  an OSI Layer 3 processing device for processing an OSI Layer 3 protocol, and wherein the OSI Layer 3 processing device is electrically coupled to the OSI Layer 2 switch device and is electrically coupled to the control module; and
  an uplink port interface electrically coupled to the OSI Layer 2 switch device, whereby the LAN manager is disposed to receive upstream data from a first LAN client and switch the received upstream data to a second LAN client on the downstream wavelength, and the LAN manager is disposed to receive an uplink data from the uplink port interface and switch the uplink data to one or more LAN clients on the downstream and the LAN manager is disposed to process an OSI Layer 3 protocol.

17. The LAN Manager of claim 16, wherein the processing the upstream data information includes using a switching device that operates at OSI Layer 2.

18. The LAN Manager of claim 17, wherein the switching device switches data using OSI Layer 2 addresses.

19. The LAN Manager of claim 17, wherein the switching device is an Ethernet switch device.

20. The LAN Manager of claim 19, wherein the Ethernet switch device includes an Ethernet media access controller (MAC).

* * * * *